(12) United States Patent
Funada

(10) Patent No.: US 9,841,090 B2
(45) Date of Patent: Dec. 12, 2017

(54) ELECTRIC LINEAR ACTUATOR

(71) Applicant: NTN Corporation, Osaka-shi (JP)

(72) Inventor: Kensuke Funada, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 14/953,316

(22) Filed: Nov. 28, 2015

(65) Prior Publication Data
US 2016/0076631 A1 Mar. 17, 2016

Related U.S. Application Data

(63) Continuation of application No. PCT/JP2014/064004, filed on May 27, 2014.

(30) Foreign Application Priority Data
May 29, 2013 (JP) ................................. 2013-112629

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *F16H 25/22* | (2006.01) |

(Continued)

(52) U.S. Cl.
CPC .......... *F16H 25/2204* (2013.01); *F16J 15/14* (2013.01); *F16H 2025/2031* (2013.01); *F16H 2025/2081* (2013.01)

(58) Field of Classification Search
CPC ......... F16H 25/2204; F16H 2025/2031; F16H 2025/2081; F16J 15/14
See application file for complete search history.

(56) References Cited

U.S. PATENT DOCUMENTS

| | | | |
|---|---|---|---|
| 4,593,780 A | 6/1986 | Saito | |
| 4,712,441 A * | 12/1987 | Abraham | ............ F16H 25/2015 |
| | | | 74/412 TA |

(Continued)

FOREIGN PATENT DOCUMENTS

| | | |
|---|---|---|
| EP | 2 520 829 | 11/2012 |
| JP | 63-104282 | 7/1988 |

(Continued)

*Primary Examiner* — Jake Cook
(74) *Attorney, Agent, or Firm* — Harness, Dickey & Pierce, P.L.C.

(57) ABSTRACT

An electric linear actuator has an electric motor, a speed reduction mechanism, and a ball screw mechanism to convert rotational motion of the electric motor to an axial linear motion of a drive shaft. The ball screw mechanism nut and screw shaft both include helical screw grooves with a large number of balls between them. The housing has a first housing portion and a second housing portion. The electric motor is mounted on the first housing portion. The second housing portion abuts an end face of the first housing portion. The first housing portion has a cylindrical gear containing portion to contain the speed reduction mechanism. An end part of the gear containing portion extends radially inward to form a bottom portion to cover the speed reduction mechanism. The bottom portion of the first housing portion and the second housing portion are formed, respectively, with abutment surfaces.

7 Claims, 5 Drawing Sheets

(51) Int. Cl.
    *F16J 15/14*     (2006.01)
    *F16H 25/20*     (2006.01)

(56) References Cited

U.S. PATENT DOCUMENTS

| | | | |
|---|---|---|---|
| 2001/0026105 A1* | 10/2001 | Torii | F16H 57/029 |
| | | | 310/75 R |
| 2005/0121251 A1 | 6/2005 | Ueno et al. | |
| 2007/0187169 A1 | 8/2007 | Sasaki et al. | |
| 2008/0217867 A1* | 9/2008 | Kato | F16H 57/029 |
| | | | 277/628 |
| 2009/0079280 A1* | 3/2009 | Terauchi | H02K 5/225 |
| | | | 310/71 |
| 2010/0060092 A1* | 3/2010 | Blakesley | H02K 11/33 |
| | | | 310/83 |
| 2011/0049814 A1 | 3/2011 | Iwase et al. | |
| 2012/0247240 A1 | 10/2012 | Kawahara et al. | |
| 2012/0298439 A1 | 11/2012 | Ji et al. | |

FOREIGN PATENT DOCUMENTS

| | | |
|---|---|---|
| JP | 2005-145431 | 6/2005 |
| JP | 2007-168613 | 7/2007 |
| JP | 2009-243621 | 10/2009 |
| JP | 2011-047448 | 3/2011 |
| JP | 2012-214090 | 11/2012 |
| WO | WO2011/135849 | 11/2011 |

\* cited by examiner

ELECTRIC LINEAR ACTUATOR

CROSS-REFERENCE TO RELATED APPLICATIONS

This application is a continuation of International Application No. PCT/JP2014/064004, filed May 27, 2014, which claims priority to Japanese Application No. 2013-112629, filed May 29, 2013. The disclosures of the above applications are incorporating herein by reference.

FIELD

The present disclosure relates to an electric linear actuator, with a ball screw mechanism, used in motors in general industries and driving sections of automobiles etc., and, more particularly, to an electric linear actuator used in a transmission or parking brake of an automobile to convert rotary motion from the electric motor to linear motion of a drive shaft, via the ball screw mechanism.

BACKGROUND

Gear mechanisms, such as a trapezoidal thread worm gear mechanism or a rack and pinion gear mechanism, have generally been used as mechanisms to convert the rotary motion of an electric motor into the axial linear motion in an electric linear actuator, used in various types of driving sections. These motion converting mechanisms involve sliding contact portions. Thus, power loss is increased. Accordingly, the size of electric motor and power consumption are increased. Thus, ball screw mechanisms have been widely used as more efficient actuators.

In prior art electric linear actuators, an output member, forming a ball screw, can be axially displaced by rotating a nut, with an electric motor supported on a housing of the actuator, to axially drive a ball screw shaft inserted into the nut. The electric linear actuator (power transmitting apparatus) 51 shown in FIG. 5 is a type used in an electric braking apparatus. It has a power drive transmitting mechanism 55 including a gear mechanism (speed reduction mechanism) 52, a ball screw mechanism 54 and a ball screw shaft 53. The gear mechanism 52 transmits rotational power of an electric motor (not shown) to the ball screw mechanism 54. This converts the rotational power to linear driving power of a ball screw shaft 53.

A housing 56 contains the driving power transmitting mechanism 55 that includes the gear mechanism 52 and the ball screw mechanism 54. The housing 56 has a case 56a and a cover 56b. It is formed from light metal such as aluminum alloy etc. The case 56a includes a plurality of screw apertures 57 to mount the electric motor to the driving power transmitting mechanism 55.

The gear mechanism 52 includes a pinion gear (not shown) secured on an output shaft of the electric motor. An idler gear 58 mates with the pinion gear and a ring gear 59 mates with the idler gear 58.

The ball screw mechanism 54 includes a nut 60 rotated by the rotational driving power from the electric motor through the gear mechanism 52. A ball screw shaft 53 is axially moved by the nut 60 through balls (not shown) rollably arranged between screw grooves of the nut 60 and the ball screw shaft 53.

The case 56a and cover 56b are separate structures. The case 56a includes a plurality of through apertures 62 that receive bolts 61. The bolts 61 are screwed into a plurality of threaded apertures 63 formed on the cover 56b, at positions corresponding to the through apertures 62. Thus, the case 56a and cover 56b can be united by inserting the bolts 61 through the apertures 62 and fastening them to the threaded apertures 63.

A bearing 64 rotationally supports a tip end of an output shaft of the electric motor. The tip end is mounted in a bore 65 formed on the top of the cover 56b. A pin 66, to prevent rotation of the ball screw shaft 53, is vertically mounted on the ball screw shaft 53. Thus, the pin 66 can be received in a slide groove 67 and linearly guide the ball screw shaft 53 along the slide groove 67. See, JP 2012-214090 A.

In the prior art electric linear actuator 51, the gear mechanism 52 and the ball screw mechanism 54 are contained within a two-piece type housing 56. The electric motor is mounted outside the housing 56. Its rotational power is transmitted to the ball screw mechanism 54 via the gear mechanism 52 which, in turn, is converted into linear motion of the ball screw shaft 53.

In the electric linear actuator 51, it is possible to reduce the diameter of the gear mechanism 52 since the motor shaft and the gear mechanism 52 are connected via the idler gear 58. However, to achieve a compact configuration of the housing 56, an outline configuration of the housing 56 is adopted with a pear-like shape partially projecting with the top portion of the cover 56b.

In such an electric linear actuator 51, driving parts, such as the ball screw mechanism 54, are contained within the housing 56 to prevent entry of muddy water or oil into the driving parts or scattering of lubricant grease to the outside. The housing 56 should have sufficient strength and durability to withstand loads applied from the driving parts and to prevent deformation of abutment surfaces or fitting surfaces between the casing 56a and cover 56b caused by reaction forces of the nut 60 against propelling forces of the ball screw mechanism 54. In this case, since the configuration of the fitting surfaces of the case 56a and the cover 56b is noncircular (i.e. pear-like configuration), it causes uneven stress therebetween and accordingly impairs sealability of the housing 56.

To reduce manufacturing cost of the electric linear actuator 51, it is preferable to omit the idler gear 58 and fastening bolts 61. However, omission of the idler gear 58 will enlarge the diameter of the gear mechanism 52. Omission of the bolts 61 will impair sealability of the housing 56.

SUMMARY

It is, therefore, an object of the present disclosure to provide an electric linear actuator intended to improve the sealability of the housing and the durability of the actuator while increasing the strength against the load by changing the cross-sectional configuration of the two-piece housing from a noncircular configuration to a circular configuration.

To achieve the object of the present disclosure, an electric linear actuator comprises a housing with an electric motor mounted on the housing. A speed reduction mechanism reduces the rotational speed of the electric motor and transmits the rotational power of the electric motor to a ball screw mechanism. This converts the rotational motion of the electric motor to axial linear motion of a drive shaft. The ball screw mechanism comprises a nut formed with a helical screw groove on its inner circumference. The nut is rotationally but axially immovably supported by rolling bearings mounted on the housing. A screw shaft is coaxially integrated with the drive shaft. The screw shaft includes a helical screw groove on its outer circumference corresponding to the helical screw groove of the nut. The screw shaft is inserted into the nut via a large number of balls. The screw shaft is axially movably but not rotationally supported relative to the housing. The housing comprises a first housing portion and a second housing portion. The electric motor is mounted on the first housing. The second housing abuts against an end face of the first housing. The first housing is formed with a cylindrical gear containing portion to retain the speed reduction mechanism. An end part of the gear containing portion of the first housing extends radially inward to form a bottom portion to cover the speed reduction mechanism. The bottom portion of the first housing and the second housing are formed, respectively, with abutment surfaces.

The electric linear actuator comprises a speed reduction mechanism to reduce the rotational speed of the electric motor and transmit the rotational power of the electric motor to a ball screw mechanism to convert the rotational motion of the electric motor to the axial linear motion of a drive shaft. The ball screw mechanism comprises a nut with a helical screw groove on its inner circumference. The nut is rotationally but axially immovably supported by rolling bearings mounted on the housing. A screw shaft is coaxially integrated with the drive shaft. The screw shaft includes a helical screw groove on its outer circumference corresponding to the helical screw groove of the nut. The screw shaft is inserted into the nut via a large number of balls. The screw shaft is axially movably but not rotationally supported relative to the housing. The housing comprises a first housing portion and a second housing portion. The electric motor is mounted on the first housing portion. The second housing portion abuts against an end face of the first housing portion. The first housing portion is formed with a cylindrical gear containing portion to contain the speed reduction mechanism. An end part of the gear containing portion of the first housing extends radially inward to form a bottom portion to cover the speed reduction mechanism. The bottom portion of the first housing portion and the second housing portion are formed, respectively, with abutment surfaces. Thus, it is possible to provide an electric linear actuator that can reduce areas of both openings of the first and second housing portion. This improves the sealability, the rigidity and the strength of the housing. In addition, it is possible to reduce the amount of sealing agent and improve the durability of the electric linear actuator.

Each of the abutment surfaces, respectively, of the first and second housings is formed with a substantially circular configuration. This makes it possible to evenly unite the two-piece housing with fastening bolts while suppressing deformation of the housing. This improves the sealability of the housing as well as durability while increasing the strength and rigidity.

At least one of the abutment surfaces of the first and second housing portions is formed with an annular sealing groove. A sealing member is interposed between the abutment surfaces of the housing portion. The sealing member may be a liquid gasket formed of curable material or an O-ring.

The first housing portion and the second housing portion are united with each other by a plurality of fastening bolts. A plurality of securing portions, formed with bolt apertures through which the fastening bolts are passed, are formed on the housing portion. The plurality of securing portions partially project from the periphery of the housing. The bolt apertures are arranged equidistantly along the periphery of the housing. This makes it possible to evenly fasten the securing bolts along the periphery of the first and second housing portions. This improves the sealability of the housing while suppressing deformation of the first and second housing portions.

At least the second housing portion of the first portion and second housing portions is formed with ribs. Each rib extends over a region from the securing portion to a cylindrical portion of the second housing portion to contain the screw shaft. This makes it possible to increase the strength and rigidity of the housing while reducing its weight. Also, this increases durability and prevents deformation of the housing to improve its sealability.

An electric linear actuator of the present disclosure comprises a housing with an electric motor mounted on the housing. A speed reduction mechanism reduces the rotational speed of the electric motor and transmits the rotational power of the electric motor to a ball screw mechanism to convert the rotational motion of the electric motor to the axial linear motion of a drive shaft. The ball screw mechanism comprises a nut formed with a helical screw groove on its inner circumference. The nut is rotationally but axially immovably supported by rolling bearings mounted on the housing. A screw shaft is coaxially integrated with the drive shaft. The screw shaft includes a helical screw groove on its outer circumference corresponding to the helical screw groove of the nut. The screw shaft is inserted into the nut via a large number of balls. The screw shaft is axially movably but not rotationally supported relative to the housing. The housing comprises a first housing portion and second housing portion. The electric motor is mounted on the first housing portion. The second housing portion abuts against an end face of the first housing portion. The first housing portion is formed with a cylindrical gear containing portion to contain the speed reduction mechanism. An end part of the gear containing portion of the first housing portion extends radially inward to form a bottom portion to cover the speed reduction mechanism. The bottom portion of the first housing portion and the second housing portion are formed, respectively, with abutment surfaces. It is possible to provide an electric linear actuator that can reduce areas of both openings of the first and second housing portions. Thus, this improves the sealability, the rigidity and the strength of the housing. In addition, it is possible to reduce the amount of sealing agent and improve the durability of the electric linear actuator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

An electric linear actuator comprises a housing formed from a die cast aluminum alloy. An electric motor is mounted on the housing. A speed reduction mechanism reduces the rotational speed of the electric motor and transmits the rotational power of the electric motor to a ball screw mechanism to convert the rotational motion of the electric motor to the axial linear motion of a drive shaft. The ball screw mechanism comprises a nut formed with a helical screw groove on its inner circumference. The nut is rotationally but axially immovably supported by a pair of rolling bearings mounted on the housing. A screw shaft is coaxially integrated with the drive shaft. The screw shaft includes a helical screw groove on its outer circumference corresponding to the helical screw groove of the nut. The screw shaft is inserted into the nut via a large number of balls. The screw shaft is axially movably but not rotationally supported relative to the housing. The housing comprises a first housing portion and second housing portion. The electric motor is mounted on the first housing portion. The second housing portion abuts against an end face of the first housing portion. Each of the abutment surfaces, respectively, of the first and second housing portions is formed with a substantially circular configuration. The first housing portion is formed with a cylindrical gear containing portion to contain the speed reduction mechanism. An end part of the gear containing portion of the first housing extends radially inward to form a bottom portion to cover the speed reduction mechanism. The bottom portion of the first housing portion and the second housing portion are formed, respectively, with abutment surfaces.

One preferred embodiment and its modification of the present disclosure will be hereinafter described with reference to the drawings.

Figure 1:
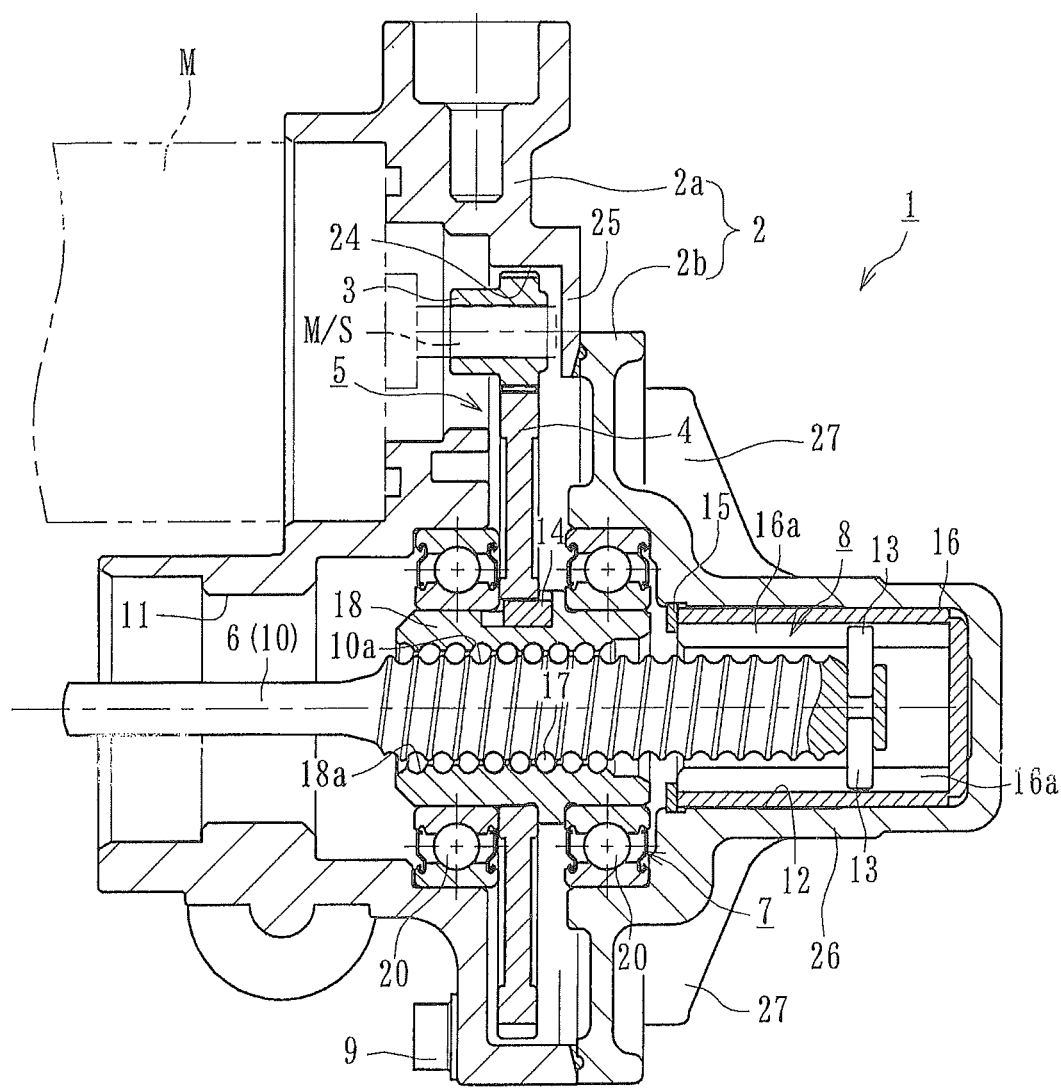
FIG. 1 is a longitudinal section view of a first embodiment of an electric linear actuator of the present disclosure.
Figure 2:
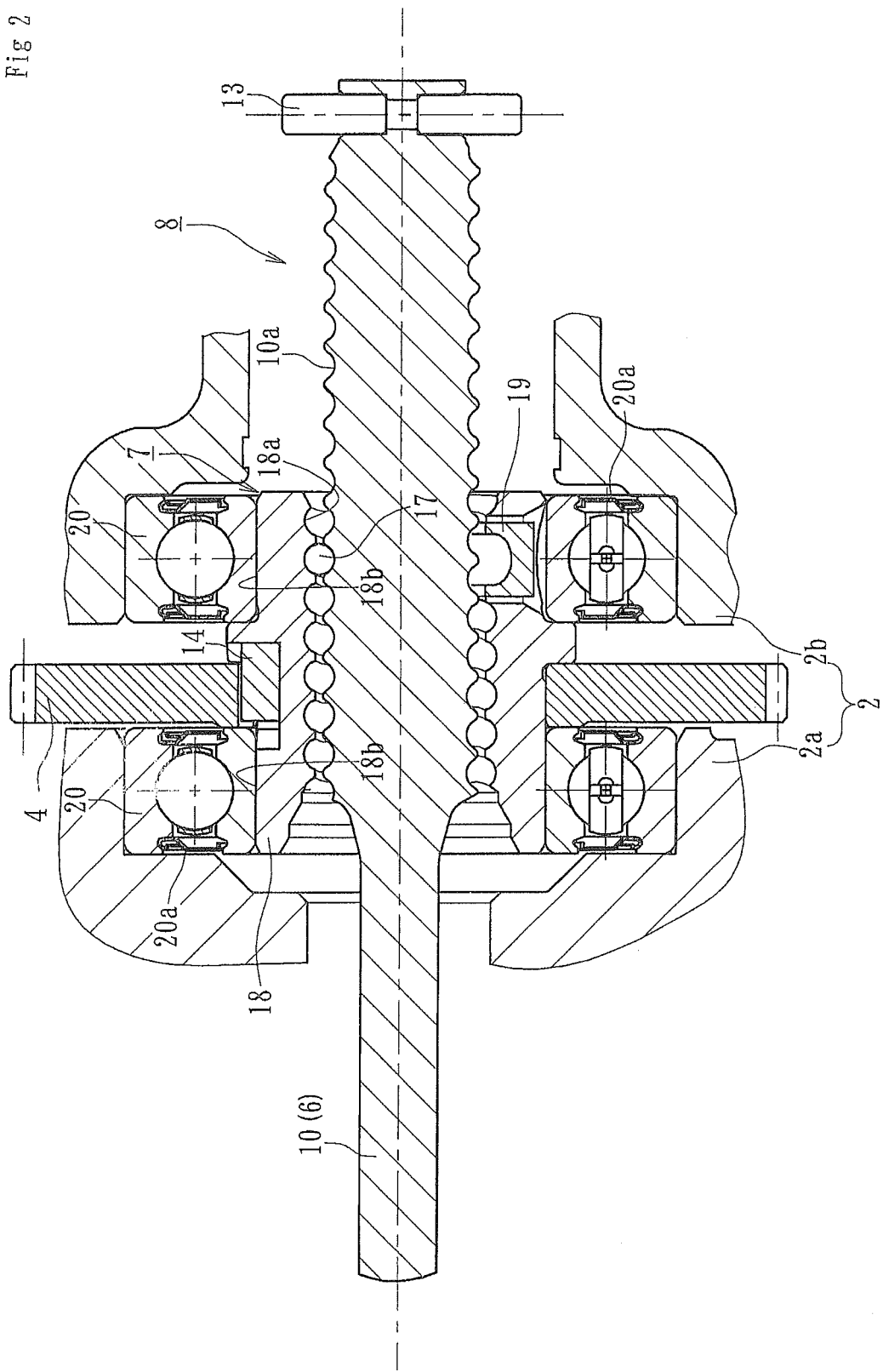
FIG. 2 is a longitudinal section view of an actuator main body of FIG. 1.
Figure 3:
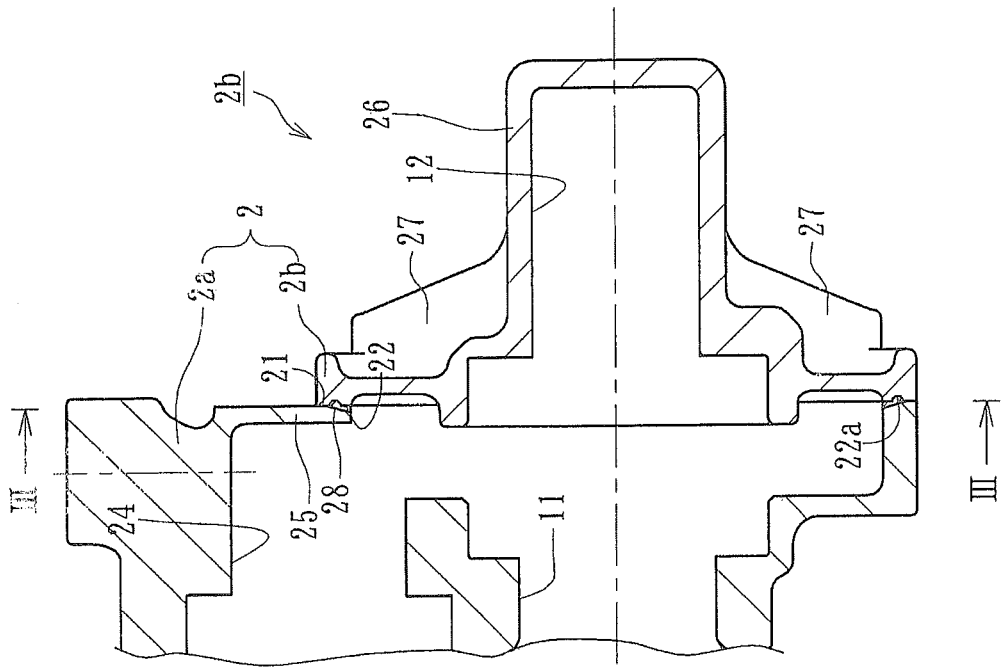
FIG. 3(a) is a front elevation view of a second housing of FIG. 1 taken along line III-III of FIG. 3(b).
FIG. 3(b) is a longitudinal section view of a housing of FIG. 1.
Figure 3:
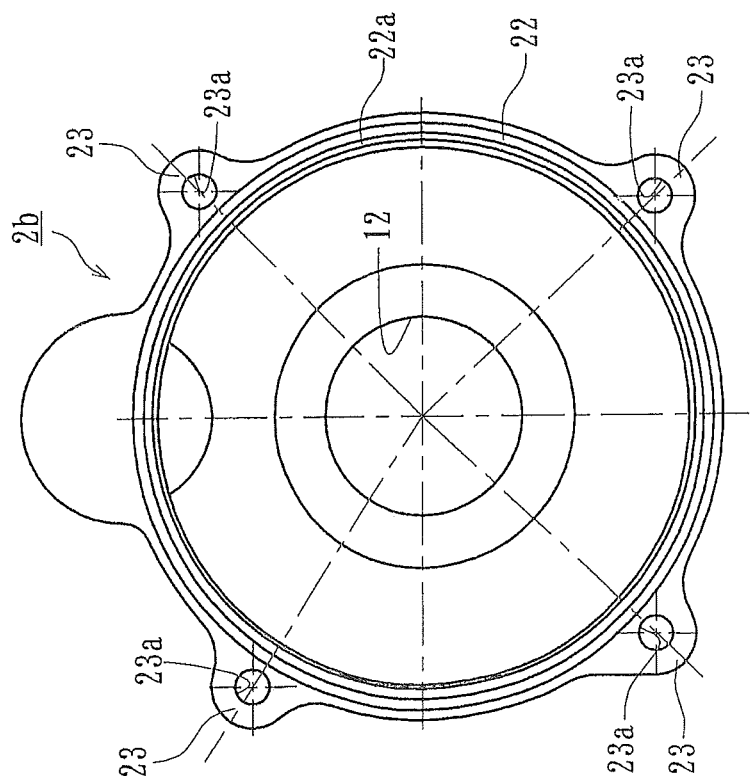
Figure 4:
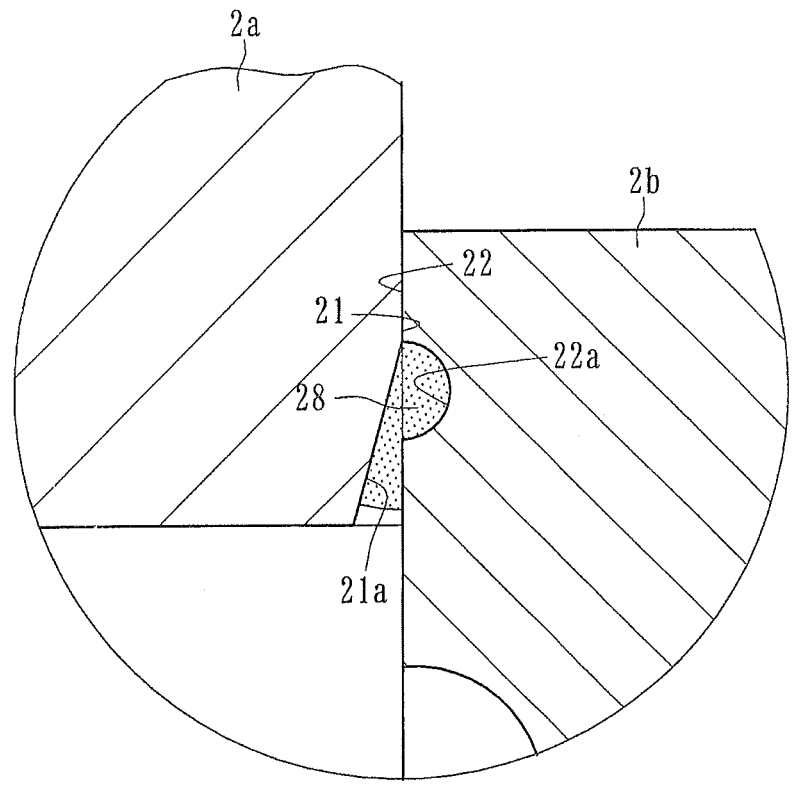
FIG. 4(a) is a partially enlarged view of a fitting portion of the housing of FIG. 3(b).
FIG. 4(b) is a partially enlarged view of a modification of FIG. 4(a).
Figure 4:
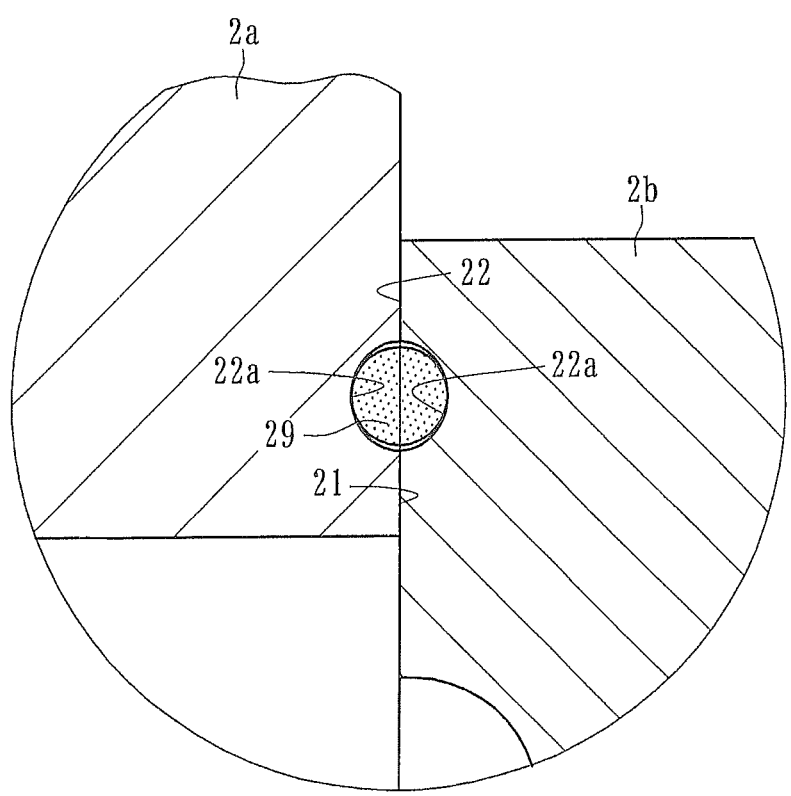
Figure 5:
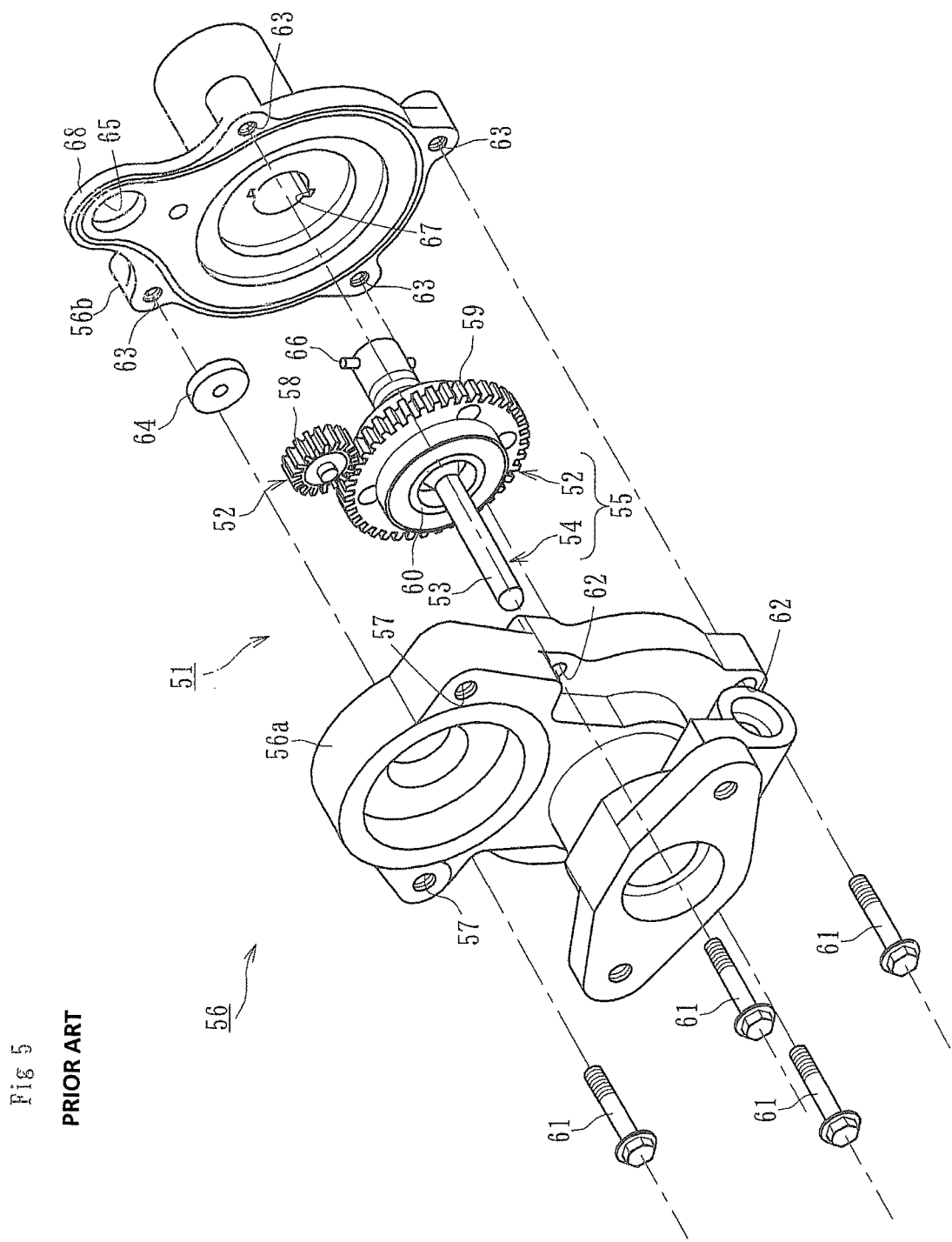
FIG. 5 is an exploded perspective view of a prior art electric linear actuator.

FIG. 1 is a longitudinal section view of one preferable embodiment of an electric linear actuator of the present disclosure. FIG. 2 is a longitudinal section view of an actuator main body of FIG. 1. FIG. 3(a) is a front elevation view of a second housing of FIG. 1 taken from a line III-III of FIG. 3(b). FIG. 3(b) is a longitudinal section view of a housing of FIG. 1. FIG. 4(a) is a partially enlarged section view of a fitting portion of the housing of FIG. 3(b). FIG. 4(b) is a partially enlarged section view of a modification of FIG. 4(a).

As shown in FIG. 1, the electric linear actuator 1 includes a housing 2, an electric motor M mounted on the housing 2, a speed reduction mechanism 5, a ball screw mechanism 7 and an actuator main body 8. The speed reduction mechanism 5 includes an input gear 3 mounted on a motor shaft M/S of the electric motor M. An output gear 4 mates with the input gear 3. The ball screw mechanism 7 converts rotational motion of the electric motor M to axial linear motion of a drive shaft 6. The actuator main body 8 includes the ball screw mechanism 7.

The housing 2 includes a first housing portion 2a and a second housing portion 2b abutted together and integrally fastened to each other by fastening bolts 9. The electric motor M is mounted on the first housing portion 2a. A through bore 11 and a blind bore 12, containing a screw shaft 10, are formed in the first and second housing portions 2a, 2b, respectively.

The housing 2 is formed of aluminum alloy such as A 6061, ADC 12 etc. by die casting. The housing 2 is treated by a so-called precipitation hardening treatment. This includes a series of heat treatments such as solution heat treatment for forming solid solution by high temperature heating, quenching treatment by rapidly cooling the solution heat treated housing, then age-hardening treatment (tempering treatment) for precipitation by holding at the room temperature or heating at a low temperature (100 to 200° C.) to cause large lattice distortion in the precipitated phase. Such a precipitation hardening treatment improves the mass productivity and reduces the manufacturing cost and the weight of the housing 2 while increasing its strength and reducing the amount of aluminum consumption.

The input gear 3 is formed as a spur gear. It is press-fit onto the end of the motor shaft M/S of the electric motor M. The output gear 4 mates with the input gear 3. The output gear 4 is integrally secured on a nut 18, via a key 14, that forms part of the ball screw mechanism 7.

The drive shaft 6 is integrally formed with a screw shaft 10 that forms part of the ball screw mechanism 7. Guide pins 13, 13 are mounted on one end (right-side end of FIG. 1) of the drive shaft 6. A guide member 16 is mounted in the blind bore 12 of the second housing 2b. The guide member 16 is formed with axially extending guide grooves 16a, 16a. The guide pins 13, 13 engage the guide grooves 16a, 16a so that the screw shaft 10 can be axially moved but not rotated. The screw shaft 10 can be prevented from falling out of the guide member by abutment of the pins 13, 13 against a stopper ring 15 mounted on the second housing portion 2b.

The guide member 16 is formed from a sheet or pipe members of blister steel such as SCr 420 or SCM 415 etc. They are plastic worked, more particularly by press working the pipe members. The surface of the guide member 16 is hardened by carburizing quenching to have a surface hardness of 50 to 64 HRC. This makes it possible to prevent wear of the guide member 16 for a long term and thus improve its durability. The guide member 16 can be made of other materials than those described above. For example, blister steel such as SCM 440, cold rolled steel sheet (JIS SPCC system) or carbon steel such as S45C. When using cold rolled steel or carbon steel, it is preferable that they are high frequency hardened to have a surface hardness of 50 to 64 HRC.

As shown in the enlarged view of FIG. 2, the ball screw mechanism 7 includes the screw shaft 10 and the nut 18 inserted on the screw shaft 10, via balls 17. The screw shaft 10 is formed on its outer circumference with a helical screw groove 10a. The screw shaft 10 is axially movably but not rotationally supported in the housing. On the other hand, the nut 18 is formed on its inner circumference with screw groove 18a corresponding to the screw groove 10a of the screw shaft 10. A plurality of balls 17 are rollably contained between the screw grooves 10a, 18a. The nut 18 is rotationally but axially immovably supported relative to the first and second housing portions 2a, 2b by two supporting bearings 20, 20. A numeral 19 denotes a bridge member to achieve an endless circulating passage of balls 17 through the screw groove 18a of the nut 18.

The cross-sectional configuration of each screw groove 10a, 18a may be either a circular-arc or Gothic-arc configuration. However, the Gothic-arc configuration is adopted in this embodiment since it can have a large contacting angle with the ball 17 and set a small axial gap. This provides large rigidity against the axial load and thus suppresses the generation of vibration.

The nut 18 is formed of case hardened steel such as SCM 415 or SCM 420. Its surface is hardened to HRC 55 to 62 by vacuum carburizing hardening. This enables omission of treatments such as buffing for scale removal after heat treatment and thus reduces the manufacturing cost. On the other hand, the screw shaft 10 is formed of medium carbon steel such as S55C or case hardened steel such as SCM 415 or SCM 420. Its surface is hardened to HRC 55 to 62 by induction hardening or carburizing hardening.

The output gear 4, forming part of the speed reduction mechanism 5, is firmly secured on the outer circumference 18b of the nut 18, via a key 14. The support bearings 20, 20 are press-fit onto the nut via a predetermined interface at both sides of the output gear 4. This prevents both the supporting bearings 20, 20 and output gear 4 from being axially shifted although strong thrust loads are applied to them from the drive shaft 6. Each supporting bearing 20 includes a deep groove ball bearing. Shield plates 20a, 20a are mounted on both sides to prevent lubricating grease, sealed within the bearing body, from leaking outside and abrasive debris from entering into the bearing body from outside.

In the illustrated embodiment, since both the supporting bearings 20, 20 are formed by deep groove ball bearing with the same specifications, it is possible to support both a thrust load, applied from the drive shaft 6, and a radial load, applied from the output gear 4. Also, this simplifies confirmation work and prevents assembly error of the bearings and thus improves the assembling operability. In this case, the term "same specifications" means that the deep groove ball bearings have the same inner diameters, outer diameters, width dimensions, rolling element sizes, rolling element numbers and internal clearances.

As shown in the enlarged view of FIG. 3(a), each of the abutment surfaces 21, 22, respectively, of the first and second housing portions 2a, 2b is formed with a substantially circular configuration. In addition, a plurality (four in the illustrated embodiment) of securing portions 23 are formed with bolt apertures 23a. The fastening bolts 9 are passed through the aperture 23a formed on the housing portions 2a or 2b. The securing portions 23 partially project from the periphery of the housing portions 2a or 2b. The bolt apertures 23a are arranged equidistantly (90° angular distance in the illustrated embodiment) along the periphery of the housing portions 2a or 2b. This makes it possible to evenly apply force by fastening the securing bolts 9 along the periphery of the first and second housing portions 2a, 2b. Thus, this improves the sealability of the housing 2 while suppressing deformation of the first and second housing portions 2a, 2b. In this specification the term "substantially circular" means that at least the abutment surfaces 21, 22, on which sealing agent 28 (FIG. 4(a)) is applied, are circular. The abutment surfaces 21, 22 have partial flanges or rectangular or noncircular mounting portions on their periphery.

As shown in FIG. 3(b), the first housing portion 2a is formed with a cylindrical gear containing portion 24. The containing portion 24 contains the input gear 3 of the speed reduction mechanism 5. An end part of the gear containing portion 24 of the first housing portion 2a extends radially inward to form a bottom portion 25 to cover the speed reduction mechanism 5. According to the present disclosure, the speed reduction mechanism 5 includes only the input gear 3 and the output gear 4, with an idler gear of the prior art being omitted. The bottom portion 25, formed on the gear containing portion 24 of the first housing portion 2a, is formed with the abutment surface 21. Thus, it is possible to make both the abutment surfaces 21, 22 of the first and second housing portions 2a, 2b substantially circular. This makes it possible to reduce the area of the first housing portion 2a. Accordingly, this improves the sealability of the housing 2, increases its strength and rigidity and additionally reduces the amount of sealing agent. Furthermore, the substantially circular abutment surfaces 21, 22 enable the two-piece housing 2 to be evenly fastened to suppress deformation. In addition, the provision of the gear containing portion 24 and its bottom portion 25 increases the axial dimension of the first housing 2a and thus improve its strength and rigidity.

In addition, at least one of the first and second housing portions 2a, 2b (the second housing portion (2b) in the illustrated embodiment) is formed with ribs 27. Each rib extends over a region from the securing portion 23 to a cylindrical portion 26 of the second housing portion 2b that contains the screw shaft 10.

Each of the ribs 27 has a circular arc configuration gradually reducing its radius and inclination from the securing portion 23 to the cylindrical portion 26. This increases the strength and rigidity of the housing, especially at its weakest cylindrical portion 26. Also, this reduces weight, increases its durability and prevents deformation of the housing 2 to improve its sealability.

As shown in an enlarged view of FIG. 4(a), according to the present disclosure, a tapered chamfer portion 21a is formed on the abutment surface 21 of the first housing portion 2a. An annular sealing groove 22a with a substantially semi-circular cross-section is formed on the abutment surface 22 of the second housing 2b. A sealing agent 28 is filled in a space between the chamfered portion 21a and the annular groove 22a. The sealing agent 28 is a liquid gasket formed from curable material. Its volume is larger than a volume of the annular sealing groove 22a and smaller than a volume of an annular space formed by the chamfered portion 21a and the sealing groove 22a. That is, excess of the sealing agent 28 protruded from the sealing groove 22a is filled within the space of the chamfered portion 21a. Thus, this prevents the sealing agent 28 from protruding outside from the abutment surfaces 21, 22. Also, it prevents falling of excess sealing agent 28.

The sealing agent 28 may be formed of e.g. liquid gasket (packing) of solventless silicone or synthetic rubber. Since such a curable material of liquid gasket can be cured after the lapse of a predetermined time, sufficient sealability can be attained after about 24 hours. The provision of the annular sealing groove 22a of a semi-circular cross-section and the tapered chamfer portion 21a effectively prevents falling of protruded sealing agent 28 in a simple manner.

Although it is shown as a liquid gasket, as an example of the sealing agent, it is possible to form annular grooves 22a, 22a with each having a semi-circular cross-section. A sealing member 29, such as an O-ring of synthetic resin, may be mounted in the grooves 22a, 22a, as shown in FIG. 4(b). Alternately although not shown, it is possible to interpose between the O-ring and the annular grooves 22a, 22a a metal gasket of copper, stainless steel or aluminum alloy, a semi-metal gasket of inorganic cushioning material covered by metal thin sheet or a sheet gasket of synthetic rubber or fluororesin.

The electric linear actuator of the present disclosure can be used for electric motors for a general industry use, driving portions of an automobile etc. and applied to an actuator with a ball screw mechanism to convert a rotational input motion from an electric motor to a linear motion of a drive shaft.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. An electric linear actuator comprising:

a housing;

an electric motor including a shaft mounted on the housing;

a speed reduction mechanism coupled with the electric motor shaft for reducing the rotational speed of the electric motor and transmitting the rotational power of the electric motor to a ball screw mechanism to convert the rotational motion of the electric motor to axial linear motion of a drive shaft;

the ball screw mechanism comprising:

a nut formed with a helical screw groove on its inner circumference, the nut is rotationally but axially immovably supported by rolling bearings mounted on the housing;

a screw shaft is coaxially integrated with the drive shaft, the screw shaft includes a helical screw groove on its outer circumference corresponding to the helical screw groove of the nut, the screw shaft is inserted into the nut via a large number of balls, the screw shaft is axially movably but not rotationally supported relative to the housing;

the housing comprises a first housing portion and second housing portion, the electric motor is mounted on the first housing portion, the second housing portion abuts against an end face of the first housing portion;

the first housing portion includes an extending cylindrical gear containing portion encircling the electric motor shaft and a speed reduction mechanism to contain the speed reduction mechanism;

an end part of the gear containing portion of the first housing extends radially inward to form a bottom portion positioned beyond the electric motor shaft to cover at least a portion of an input gear of the speed reduction mechanism; and the bottom portion of the first housing portion and the second housing portion are formed, respectively, with abutment surfaces.

2. The electric linear actuator of claim 1, wherein each of the abutment surfaces, respectively, of the first and second housing portions includes a substantially circular configuration.

3. The electric linear actuator of claim 1, wherein at least one of the abutment surfaces of the first and second housing portions include an annular sealing groove and a sealing member is interposed between the abutment surfaces of the housing.

4. The electric linear actuator of claim 3, wherein the sealing member is a liquid gasket formed of curable material.

5. The electric linear actuator of claim 3, wherein the sealing member is an O-ring.

6. The electric linear actuator of claim 1, wherein the first housing portion and the second housing portion are united with each other by a plurality of fastening bolts, a plurality of securing portions on one of the first or second housing portions is formed with bolt apertures that enable passage of the fastening bolts, the plurality of securing portions partially projected from a periphery of the first and second housing portions, and wherein the bolt apertures are arranged equidistantly along the periphery of the first or second housing portions.

7. The electric linear actuator of any one of claim 1, wherein at least the second housing portion of the first and second housing portions includes ribs, each rib extending over a region from a securing portion to a cylindrical portion of the second housing portion to contain the screw shaft.

* * * * *